US006841895B1

(12) United States Patent
Kelwaski

(10) Patent No.: US 6,841,895 B1
(45) Date of Patent: Jan. 11, 2005

(54) CONFIGURABLE SWITCH ARRAY

(75) Inventor: H. Edward Kelwaski, Craigville, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 11 days.

(21) Appl. No.: 10/625,379

(22) Filed: Jul. 23, 2003

(51) Int. Cl.[7] .............................. B60L 1/00; H01H 9/00; H01H 35/00; H02B 1/04

(52) U.S. Cl. ...................... 307/10.1; 200/1 R; 200/293; 307/116; 361/673

(58) Field of Search ................................ 200/1 R, 292, 200/293–307; 361/600–832; 307/9.1–10.8, 112–139

(56) References Cited

U.S. PATENT DOCUMENTS 4,688,262 A 8/1987 Schaefer et al.
5,579,002 A 11/1996 Iggulden et al.
5,734,137 A 3/1998 Wakefield
6,140,593 A 10/2000 Bramesfeld et al.
6,163,282 A 12/2000 Mitsuzuka et al.
6,477,010 B1 11/2002 Johnson et al.
6,635,972 B1 * 10/2003 Barthel et al. ............... 307/9.1
2002/0150874 A1 10/2002 Singh et al.

* cited by examiner

*Primary Examiner*—James R. Scott
(74) *Attorney, Agent, or Firm*—Jeffrey P. Calfa; Dennis Kelly Sullivan; Susan L. Lukasik

(57) ABSTRACT

The configuration switch array for motor vehicle instrument panels provides for the free substitution and replacement of switches without rewiring of the instrument panel. Each switch assembly in the switch array includes a plurality of identification fingers projecting from the bottom of a switch assembly housing. The pattern and number of the identification fingers indicate the function the switch assembly is to invoke.

11 Claims, 8 Drawing Sheets

CONFIGURABLE SWITCH ARRAY

BACKGROUND OF THE INVENTION

1. Technical Field

The present invention relates to switch arrays for motor vehicle instrument panels and more particularly to a switch array allowing free substitution and replacement of switches without rewiring of the panel.

2. Description of the Problem

A large number of two and three position electrical switches are mounted on the instrument panel of contemporary motor vehicles, particularly heavy duty vehicles such as trucks. Typically these switches are mounted in arrays which accommodate as many as six switches. The particular functions controlled by these switches are dependent upon the options and accessories installed on a truck, which may be subject to change depending upon different uses to which the truck is put, or even depending upon the type of trailer pulled by the truck. In the past, once a switch was installed on a dash or instrument panel, it has been difficult to mount new switches, remove switches, or to change the position of switches to suit the preferences of the driver/operator due to the need to rewire the instrument panel.

U.S. Pat. No. 6,140,593 to Bramesfeld et al., teaches a switch array which allows two-position switches to be added to, removed from, or moved in a switch pack array. The switch array taught by Bramesfeld provided a housing having a number of bores extending from a front face of the housing through to the rear face. A resilient switch card is positioned on the rear face of the housing having contact areas aligned on the plurality of bores through the housing. Switch caps are moveably (and removably) positioned in the bores for sliding movement in the bores. One or more pins projects from each switch cap and is brought into contact with contact areas on the switch card upon depression of the switch cap. Because the arrangement of the pins is unique to particular loads, the combination of contact areas impinged upon depression of the switch cap generates a unique signal indicating the load to be activated.

Since depression of the switch cap is required before identification of the switch type is made, the switch array of Bramesfeld does not conveniently provide for three position switches. Nor does Bramesfeld allow identification of switches to be made when the switch is not closed.

SUMMARY OF THE INVENTION

According to the invention there is provided a configurable switch array for use in motor vehicle instrument panels. Switches are freely positionable in, movable on and removable from the instrument panel with identification of the intended functionality of the switch assembly being determined upon the positioning of the switch assembly in the switch array. Each switch assembly includes a housing. Associated with each housing are identifying indicia having a pattern uniquely associated with a particular vehicle function. A circuit board underlying the switch array housing includes indicia identifying features allowing an identifying number to be generated for the switch assembly. Typically the identifying indicia are a plurality of identification fingers projecting from the bottom of a switch assembly housing. The pattern and number of the identification fingers indicate the function the switch assembly is to invoke and impinge against identification contact areas on the circuit board upon installation of a switch assembly.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
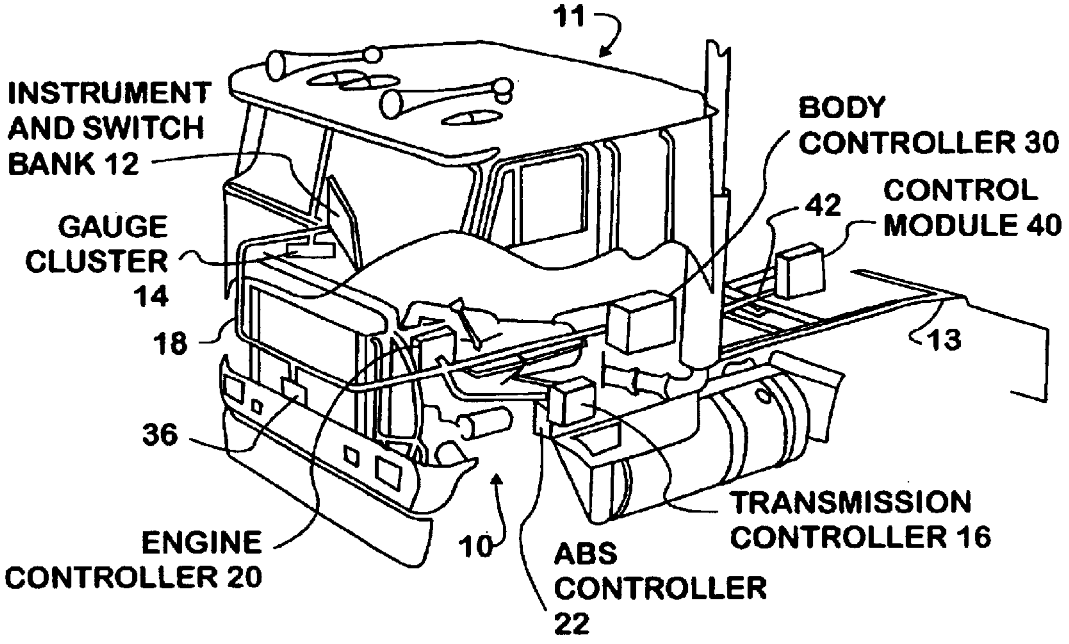
FIG. 1 is a cut away perspective view of truck illustrating the location of a vehicle electronic control system.

Referring now to the figures and in particular to FIG. 1 there is illustrated a vehicle electrical system 10 installed on a vehicle 13. Vehicle electrical system 10 comprises a body controller 30 which manages a number of vocational controllers distributed about vehicle 13 by communication over data transmission links. Most vehicle electrical components are directly controlled by one of a group of vocational controllers or by the body controller 30. Included among the vocational controllers are a gauge cluster controller 14, an engine controller 20, and transmission controller 16, an anti-lock brake system controller 22 and the special case of the body controller 30. An instrument and switch bank 12 is under the control of the gauge cluster controller 14. These vocational controllers are generally supplied by suppliers of the related components. For example, the engine controller 20 is supplied with an engine by an engine manufacturer. Control signal protocols for these controllers are both standardized and public as part of the SAE J1939 standard. The vocational controllers are linked to one another using a J1939 data link 18. A diagnostic port 36 is provided for connection of an external diagnostic computer, which may be attached to the data link 18 as a temporary network node.

A second serial data bus 42, also constructed in accordance with the SAE J1939 standard, provides for proprietary data transmission among control modules 40 installed on vehicle 13 by the vehicle's manufacturer. Control modules 40 may be provided to control any manner of specialized devices on a vehicle such as motors for water pumps on a fire fighting truck or blowers for HVAC units on busses.

Figure 2:
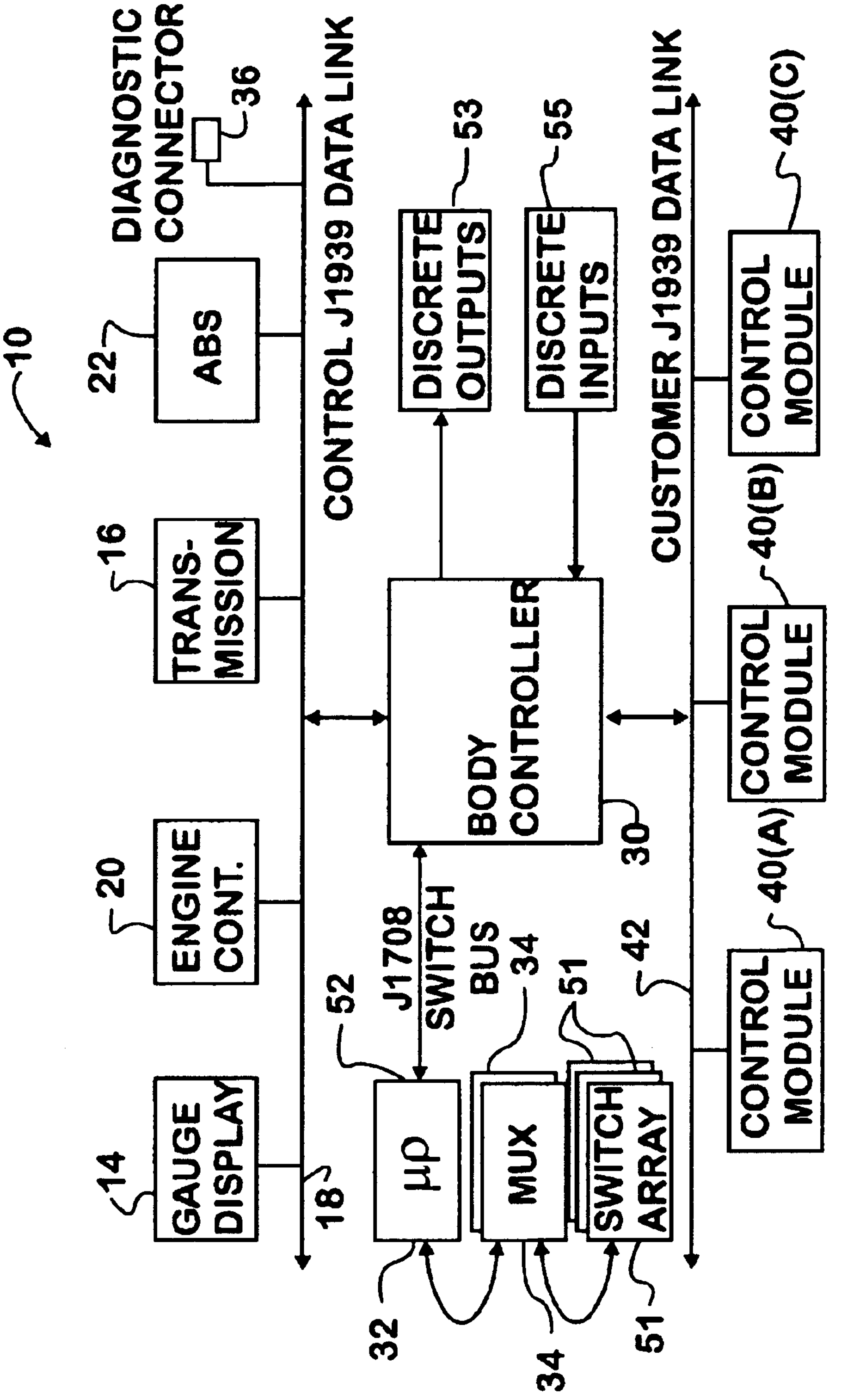
FIG. 2 is a high level block diagram of the vehicle electronic control system.
Figure 3:
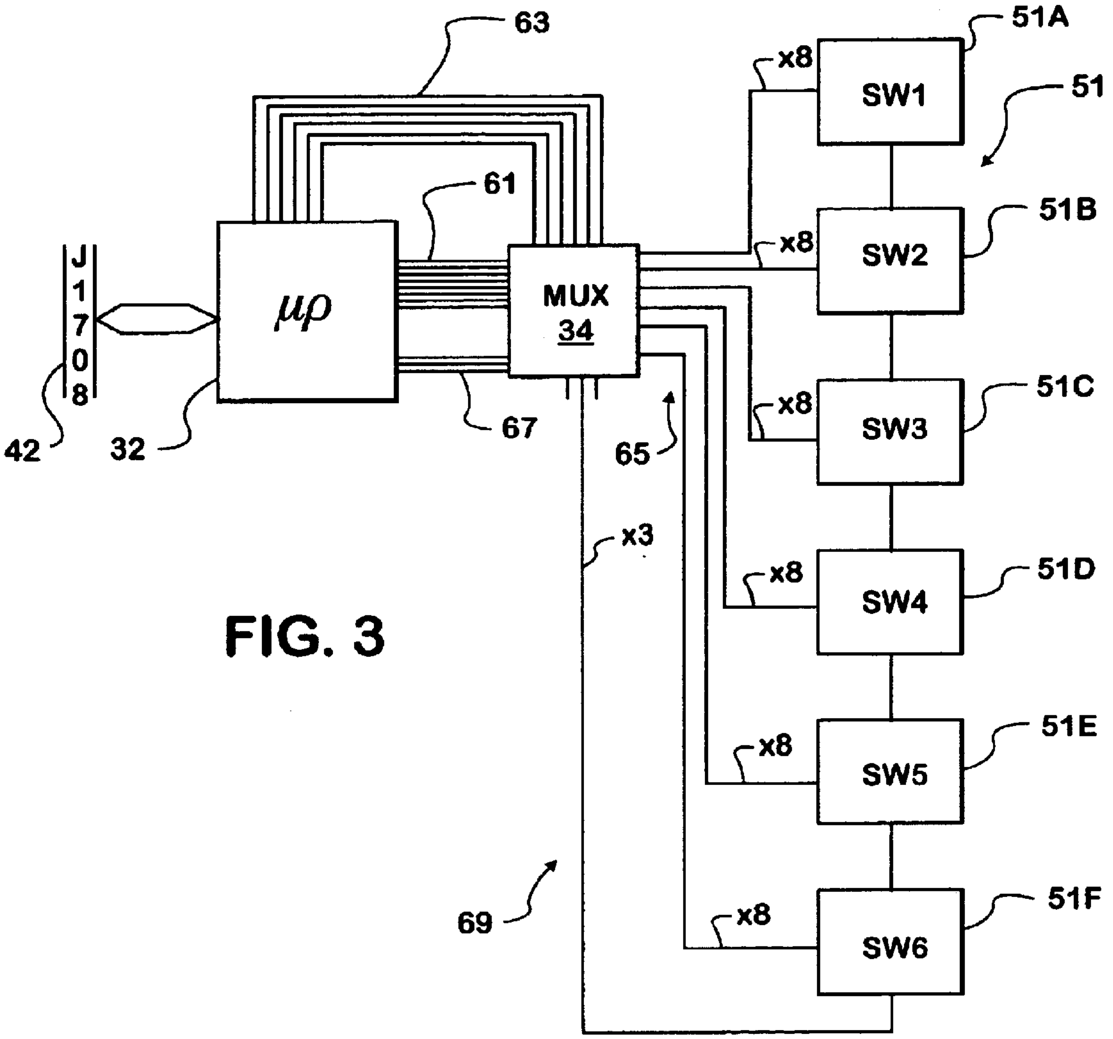
FIG. 3 is a detailed block diagram of switch array control arrangements from the vehicle electronic control system of FIG. 2.

Referring now to FIGS. 2 and 3, a more detailed illustration of vehicle control system 10 and the configurable switch array control circuitry is provided. In addition to the large bandwidth data links 18 and 42, control system 10 includes a smaller bandwidth data link 52 constructed in accordance with the SAE J1708 standard over which body controller 30 communicates with one or more switch arrays 51. Body controller 30 also provides signals to a plurality of discrete outputs 53 (including typically vehicle lamps among other devices) and receives signals from a plurality of discrete input sources 55. As described above, data link 18 couples a plurality of vocational controllers, including a gauge controller 14, an engine controller 20, a transmission controller 16, an ABS controller 22 and body controller 30, and provides a connection point for a temporary diagnostic controller mode, e.g. diagnostic connector 36. Customer data link 42 couples a second group of controllers 40A–C, which are directed to vehicle specific functions, and body controller 30 which is the direct source of instructions to these controllers. Switches installed in switch arrays 51 may advantageously be used to direct body controller 30 to provide control signals to both discrete outputs 53 and to control modules 40A–C. Switch arrays 51 may also be used to initiate control signals for transmission on data link 18.

Switches in a switch array 51 are not directly connected to body controller 30, but rather communicate with the body controller through a local switch array controller or microprocessor 32 which handles communications with the body controller over a J1708 bus 52. Microprocessor 32 selects a particular switch location by switch location specific select signals to a multiplexor 34 which in turn couples particular switch locations in switch array 51 to microprocessor 32. Multiplexor 34 is connected to contacts for each of the switch locations in a switch array 51 allowing both the identification code for a switch to be read as well as the switch's state (e.g. off, low, high). Microprocessor 32 determines the combination code associated with each switch present by selecting switch locations through the multiplexor 34 and transmits the combination code along with the switch state to body controller 30 which determines which control signal code to transmit on data link 18 or data link 42, or whether to activate (or deactivate) a discrete output 53. Body controller 30 is programmed to identify particular combination codes with particular devices or with the need to issue further instructions to yet another controller. One multiplexor 34 may be provided for each switch array 34.

Microprocessor 32 is connected to a multiplexor 34 with six select lines 63, eight identification lines 61 and three switch state lines 67. Multiplexor 34 is connected to each switch location 51A–51F in switch array 51 by eight identification lines 65 and three switch state lines 69. Should microprocessor 32 have a large enough number of input pins, multiplexor 34 can be dispensed with.

Figure 4:
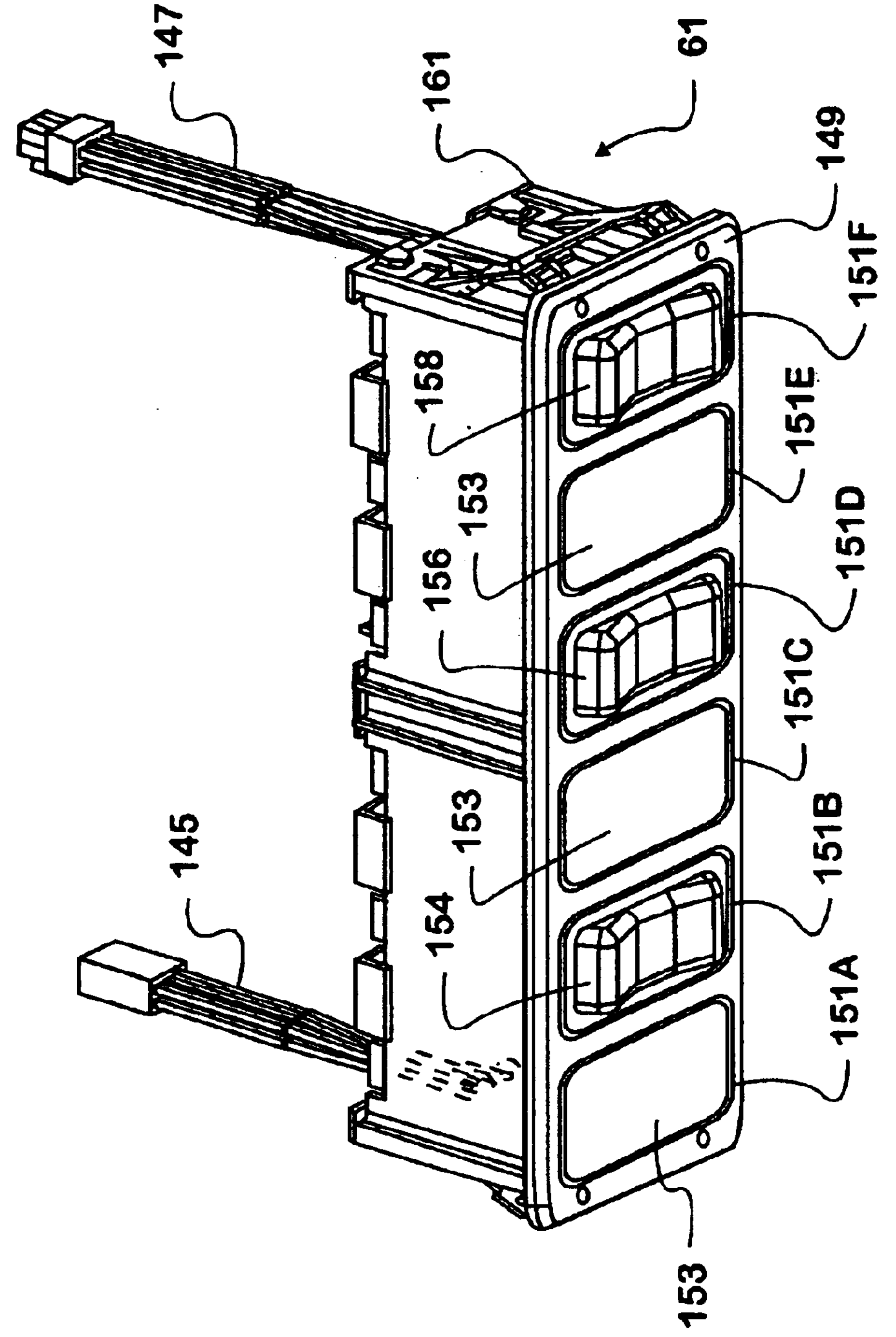
FIG. 4 is a perspective view of a switch array.
Figure 5:
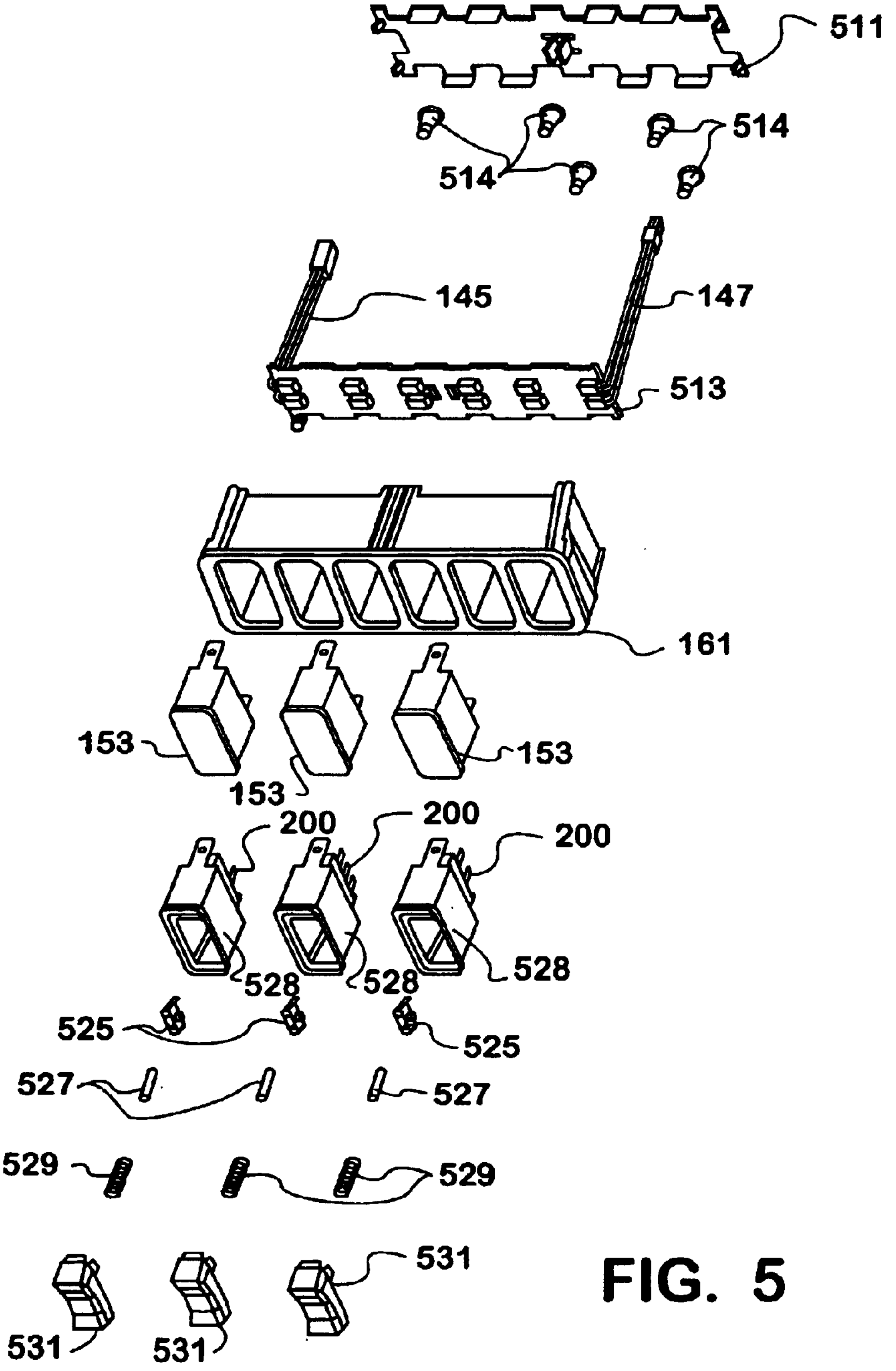
FIG. 5 is an exploded perspective view of the switch array of FIG. 4.

Referring to FIGS. 4 and 5, a switch array assembly 61 implementing the invention is shown. Switch array assembly 61 comprises a housing 161 having a front face 149 in which are defined six switch assembly receptacles or receiving locations 151A–F. Three switch locations 151A, 151C and 151E are unused and the locations filled by closeout blanks 153. Three switch locations 151B, 151D and 151F are filled by rocker switch assemblies 151B, 151D and 151F, respectively. Extending from the back of housing 161 are two connecting wire assemblies 145 and 147. Appropriate resilient locking tabs as known in the art retain switch assemblies in the receptacles.

Switch array assembly 61 is constructed from a base housing 161 which is characterized by six switch assembly receptacles 151A–F which pass from the front of the housing through to the back of the housing. The back of the housing is dosed by a circuit board 513 which has one face oriented toward the switch assembly receptacles 151A–F closing the ends of the receptacles distal to front face 149. As described below, circuit board 513 has contact points on the face oriented toward the housing and cooperating with switch assemblies for identifying the switch and determining its state. Electrical leads 145 and 147 depend from the ends of the circuit board 513. Closeout blanks 153 are conventional, being shaped and sized to fit the receptacles and to lock into position with coming into contact with circuit board 513.

Figure 7:
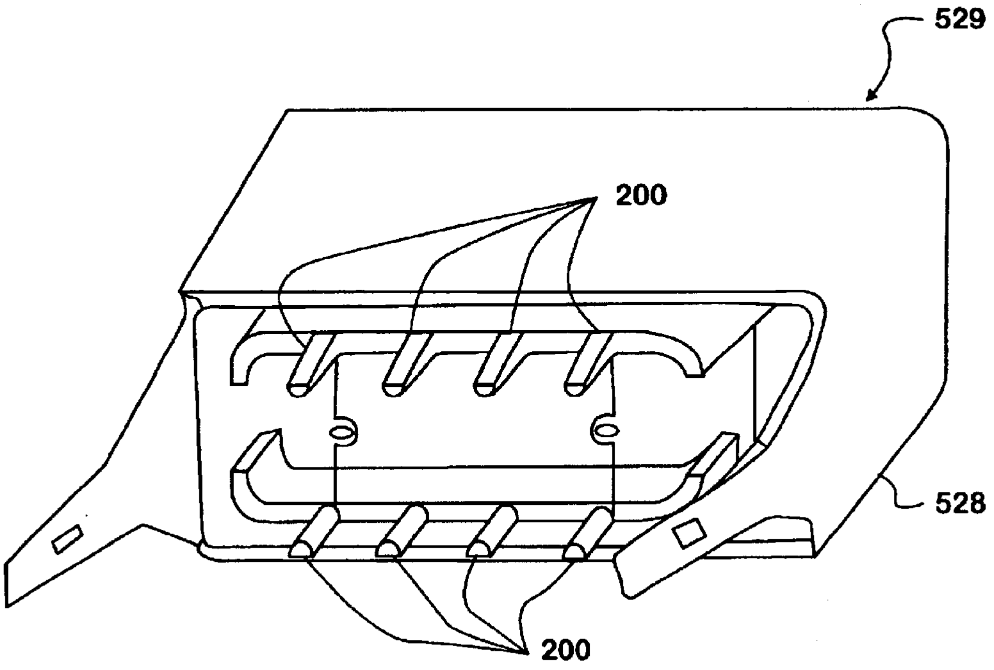
FIG. 7 is a perspective view of rocker housing for a switch from the switch array.
Figure 8:
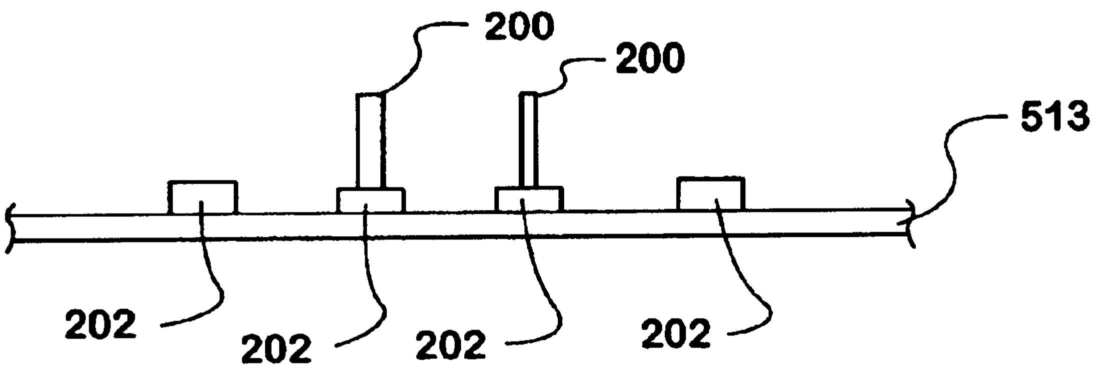
FIG. 8 is a cross sectional view of a portion of a switch and circuit board.

A back cover 511 fits over circuit board 513 to close the back of housing 161. Five twist lock lamps 514 may be fitted into and secured in circuit board 513 to provide illumination for the switches. Three rocker switch assemblies are illustrated, which are identical to one another except for modifications to the lead insertion end of the housings from each of which extend a plurality of identification fingers 200. The number and pattern of identification fingers 200 indicates the function a rocker switch assembly is intended to implement. Otherwise each rocker switch assembly includes a rocker 531, a biasing spring 529, a push rod 527, and an actuation cam 525, all of which are fitted into each of the housings. As shown by a representative housing 528 in FIG. 7, up to eight identification fingers extend downwardly from the housing in two parallel rows of four fingers each, their position unaffected by the state of the switch of switch assembly 529. For each functional application of a rocker switch a different combination of identification fingers 200 is removed or omitted providing a unique identifier for the function. This is illustrated in FIG. 8 for one row of fingers 200, where two of four fingers have been removed leaving two fingers in contact with identification area 202 on circuit board 513. The function associated with the identification number is programmed into body controller 30. Identification fingers 200 work by impinging against identification contact areas on circuit board 513. It will no occur to those skilled in the art that alternative identifying indicia can be used instead of identification fingers.

Figure 6:
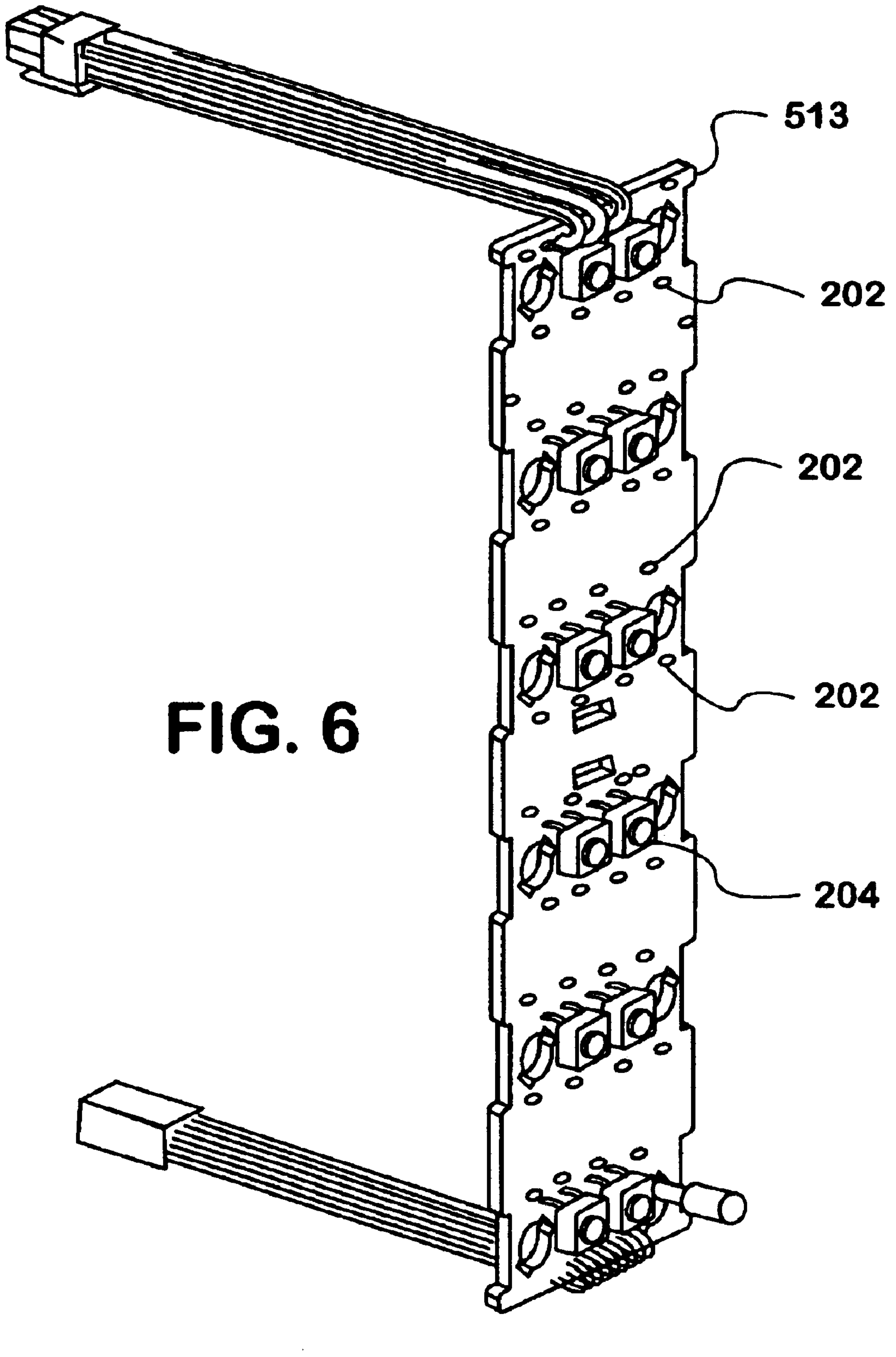
FIG. 6 is a perspective view of circuit board for the switch array.

Referring now to FIG. 6, circuit board 513 is shown illustrating the positioning of contact areas 202 associated with each switch location. Eight identification contact areas 202 are provided at each switch location allowing any rocker switch assembly to be located any location and still be identified. Centered in each set of eight identification contact areas 202 are sets of double switches 204 allowing determination as to which of three states a rocker switch is in.

The invention provides a configurable switch array in switch types can be identified without depression or closure of the switch. This allows one type of assembly for either two or three position switches and diagnostic routines to be run identifying which types of switches are present and provide readout of such to a diagnostic computer attached to the diagnostic port.

While the invention is shown in only one of its forms, it is not thus limited but is susceptible to various changes and modifications without departing from the spirit and scope of the invention.

What is claimed is:

1. A switch array comprising:

a housing having a front face defining a plurality of receptacles open toward the front face for receiving switch assemblies;

a backing circuit board having a plurality of sets of contact identification points on a forward face associated with and oriented toward a back end of each receptacle; and at least a first switch housing mounted in any one of the receptacles of the switch array, the switch housing having a plurality of identification pins of unique number and arrangement extending from the switch housing into contact with the contact identification points on the backing circuit board.

2. A switch array as set forth in claim 1, further comprising:

a three position rocker switch installed in the switch housing.

3. A switch array as set forth in claim 1, further comprising:

a data link;

a switch array controller generating an identification number from the number and arrangement of the identification pins at the first switch housing; and means for communicating the identification number over the data link.

4. A configurable switch array comprising:

a switch array housing having a plurality of switch positions;

a plurality of switch assemblies each of which are positionable in any one of the plurality of switch positions in the switch array housing;

unique identifying indicia associated with each switch assembly; and the switch array housing having cooperative identifying indicia reading means adapted to generate a value for any unique identifying indicia upon interrogation without regard to switch assembly state.

5. A configurable switch array as set forth in claim 4, further comprising:

a microprocessor for interrogating each switch position;

a data bus connected between the microprocessor and a vehicle body controller programmed to associate the value for each switch assembly in the configurable switch array and responsive to the state of the switch array for selectively invoking a particular function.

6. A configurable switch array as set forth in claim 5, wherein the identifying indicia are differing numbers and patterns of fingers projecting from one face of each switch assembly housing.

7. A configurable switch array as set forth in claim 6, further comprising:

a circuit board backing to the switch array housing; and identification contact areas on a face of the circuit board impinged by the fingers projecting from the switch assembly housing.

8. A motor vehicle electrical control system comprising:

a body controller;

a data link;

a switch array controller connected to communicate with the body controller over the data link;

a switch array electrically coupled with the switch array controller, including a plurality of switch receiving positions;

a plurality of switch assemblies each of which are positionable in any one of the plurality of switch positions in the switch array housing;

unique identifying indicia associated with each switch assembly; and the switch array housing having cooperative identifying indicia reading means adapted to generate a value for any unique identifying indicia upon interrogation by the switch array controller.

9. A motor vehicle as set forth in claim 8, the switch array controller further comprising:

a microprocessor for interrogating each switch position;

a multiplexor coupled between the microprocessor and each switch position providing selective connection between the microprocessor and a switch position;

a data bus connected between the microprocessor and the body controller; and the body controller including programming providing an association between all possible values for each switch assembly in the configurable switch array and a particular function and further providing for invoking a function in response to identification of a switch and determination of the state of the switch.

10. A configurable switch array as set forth in claim 9, wherein the identifying indicia are differing numbers and patterns of fingers projecting from one face of each switch assembly housing.

11. A configurable switch array as set forth in claim 10, further comprising:

a circuit board backing to the switch array housing; and identification contact areas on a face of the circuit board impinged by the fingers projecting from the switch assembly housing.

* * * * *